United States Patent [19]
Fenk

[11] Patent Number: 6,100,799
[45] Date of Patent: Aug. 8, 2000

[54] PROCESS AND DEVICE FOR INDICATING BRAKING POWER OR DELAY IN CARS

[75] Inventor: Johann Fenk, Ebesried, Germany

[73] Assignee: Bayerische Motoren Werke Aktiengesellschaft, Munich, Germany

[21] Appl. No.: 08/877,577

[22] Filed: Jun. 17, 1997

[30] Foreign Application Priority Data

Jun. 17, 1996 [DE] Germany .......................... 196 24 046

[51] Int. Cl.[7] .................................................. B60Q 1/50
[52] U.S. Cl. ......................... 340/467; 340/463; 340/468; 340/471; 340/479; 307/10.8; 362/80
[58] Field of Search .................... 340/467, 463, 340/468, 479, 471, 464; 307/10.8; 362/80

[56] References Cited

U.S. PATENT DOCUMENTS

| | | | |
|---|---|---|---|
| 4,231,013 | 10/1980 | Freeman et al. | 340/479 |
| 5,139,115 | 8/1992 | Browne et al. | 340/463 |
| 5,231,373 | 7/1993 | Freeman et al. | 340/469 |
| 5,448,456 | 9/1995 | Huynh | 340/479 |
| 5,457,439 | 10/1995 | Kuhn | 340/479 |
| 5,463,370 | 10/1995 | Ishikawa et al. | 340/439 |
| 5,594,415 | 1/1997 | Ishikawa et al. | 340/467 |
| 5,594,416 | 1/1997 | Gerhaher | 340/467 |
| 5,642,094 | 6/1997 | Marcella | 340/479 |

FOREIGN PATENT DOCUMENTS

| | | |
|---|---|---|
| 0 381 767 | 8/1990 | European Pat. Off. . |
| 2 649 054 | 1/1991 | France . |
| 2 659 610 | 9/1991 | France . |
| 1 808 794 | 6/1971 | Germany . |
| 2 012 484 | 9/1971 | Germany . |
| 2 361 356 | 8/1974 | Germany . |
| 28 06 801 | 8/1979 | Germany . |
| 33 14 305 | 10/1984 | Germany . |
| 33 19 731 A1 | 12/1984 | Germany . |
| 35 16 118 A1 | 11/1986 | Germany . |
| 37 24 255 A1 | 2/1989 | Germany . |
| 91 04 454 | 8/1991 | Germany . |
| 42 13 148 A1 | 11/1992 | Germany . |
| 41 39 215 C2 | 6/1993 | Germany . |
| 42 17 710 A1 | 12/1993 | Germany . |
| 42 28 972 A1 | 3/1994 | Germany . |
| 196 05 813 A1 | 8/1996 | Germany . |

*Primary Examiner*—Nina Tong
*Attorney, Agent, or Firm*—Evenson, McKeown, Edwards & Lenahan, P.L.L.C.

[57] ABSTRACT

The invention relates to a process and an arrangement for indicating the braking intensity or the deceleration of a vehicle. A signal generating device generates a signal corresponding to a deceleration of the vehicle, or a brake pedal force of the driver. An indicating device, which has at least two brake lights, indicates braking information assigned to the respective signal and a controller controls the indicating device on the basis of the signal provided by the signal generating device. The indicating device outputs various signals which correspond to various respective levels of braking intensity. The braking signal information is provided in a detailed form which does not have to be learned separately but which can be perceived directly by the driver based on knowledge already stored in the driver's subconscious from normal driving operation and experience.

24 Claims, 9 Drawing Sheets

STEP 1

STEP 2

STEP 3

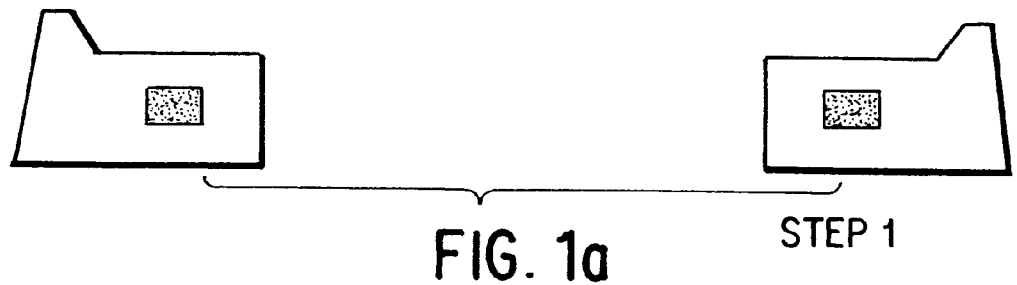
FIG. 1a  STEP 1
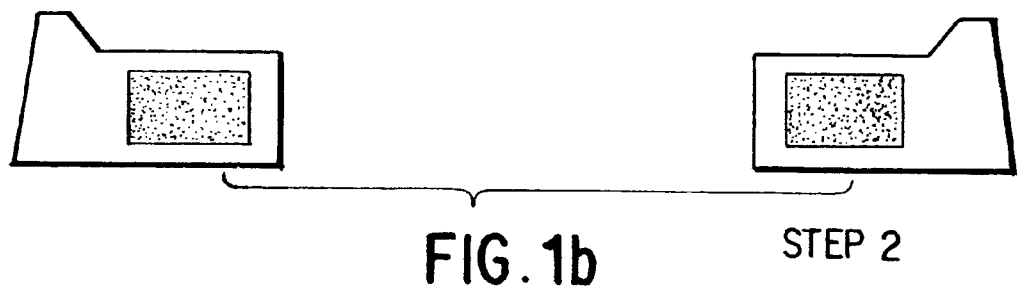
FIG. 1b  STEP 2
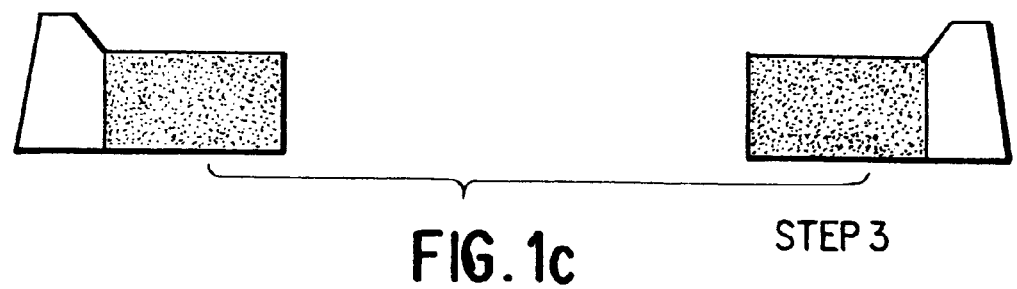
FIG. 1c  STEP 3

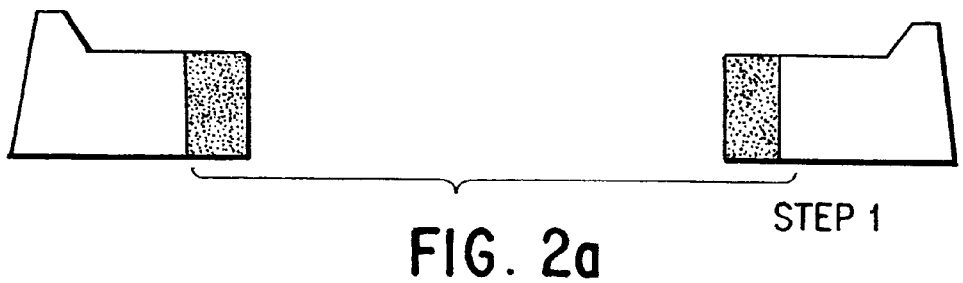
FIG. 2a STEP 1
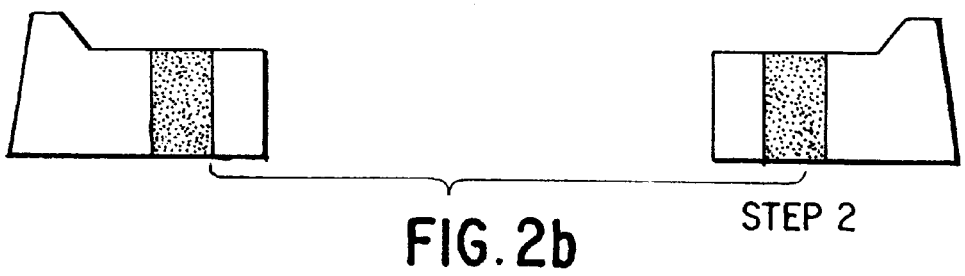
FIG. 2b STEP 2
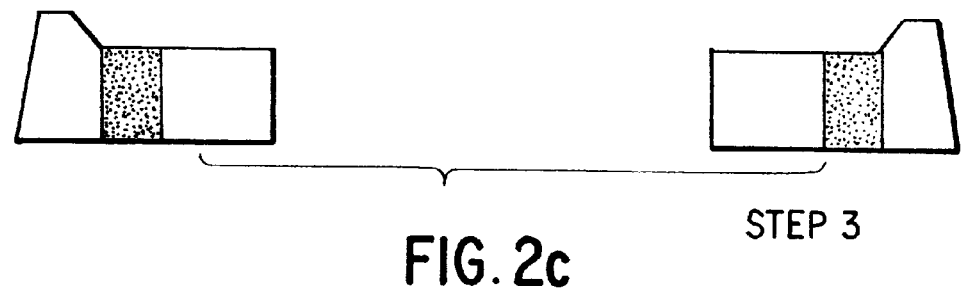
FIG. 2c STEP 3

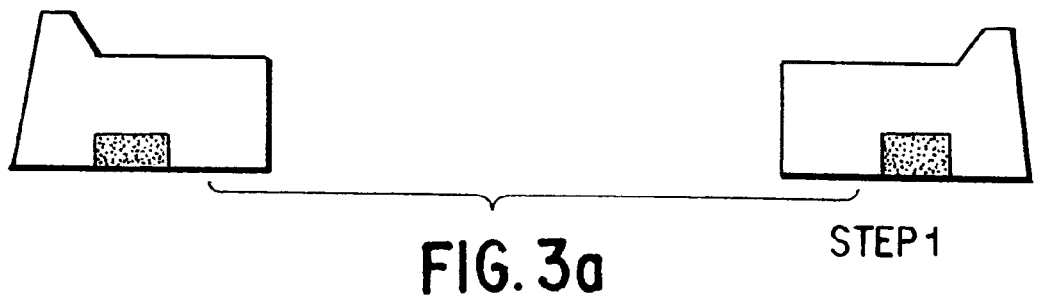
FIG. 3a STEP 1
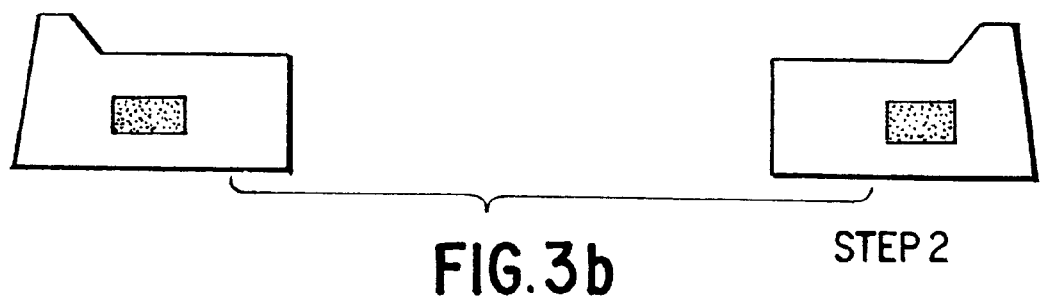
FIG. 3b STEP 2
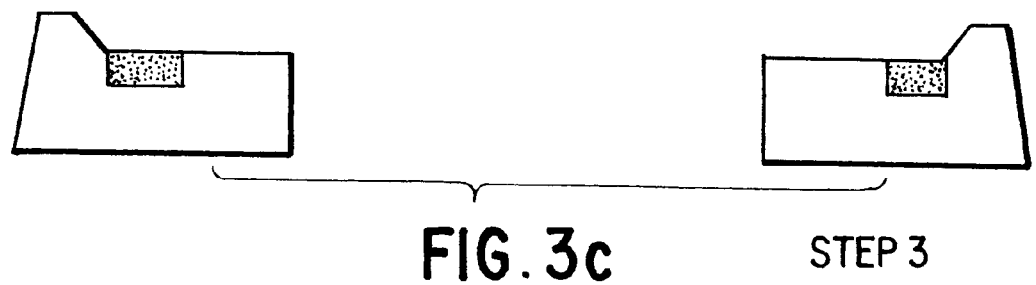
FIG. 3c STEP 3

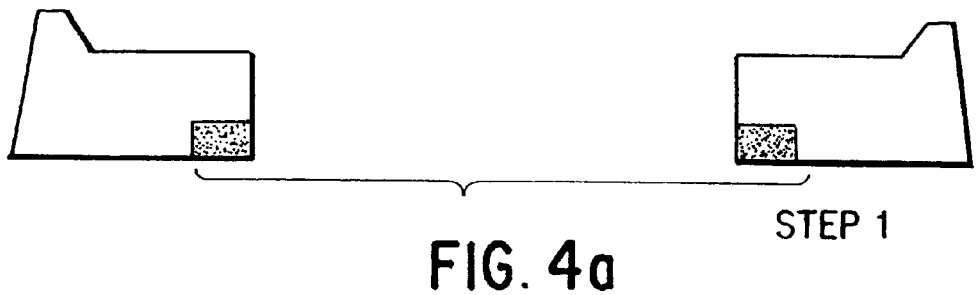
FIG. 4a  STEP 1
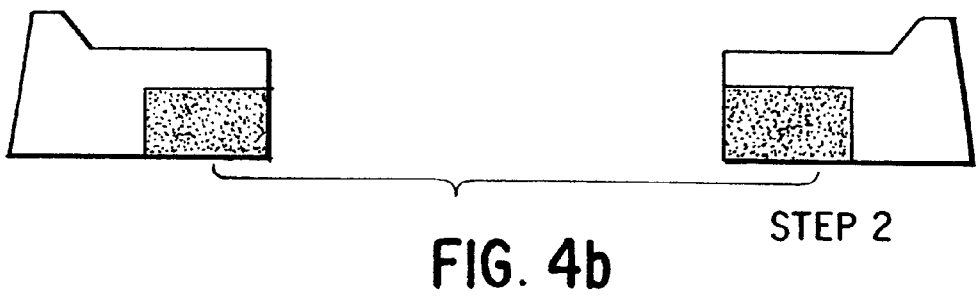
FIG. 4b  STEP 2
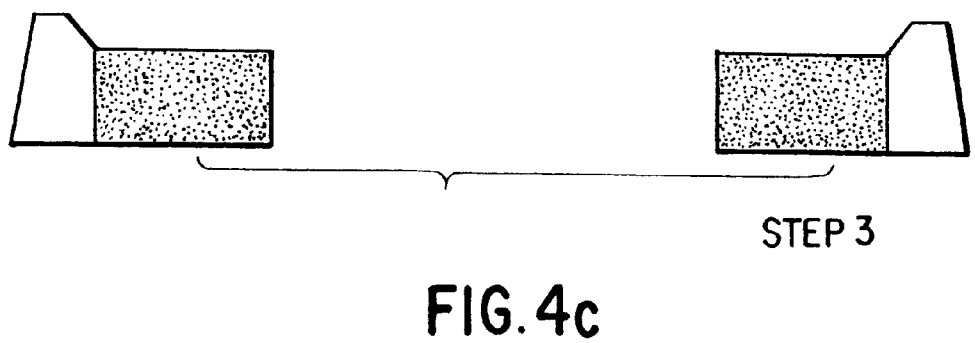
STEP 3
FIG. 4c

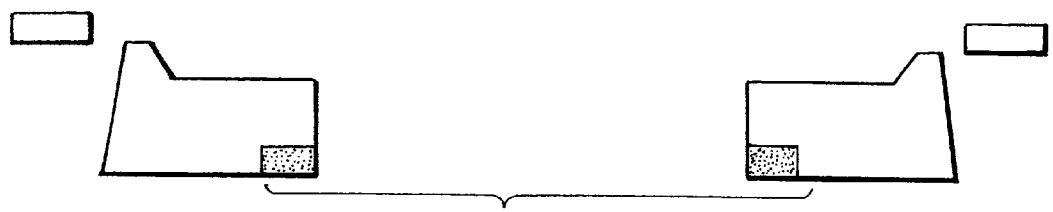
FIG. 5a  STEP 1
FIG. 5b  STEP 2
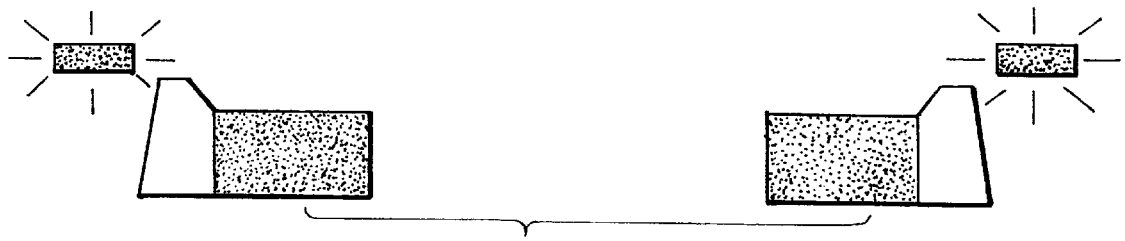
FIG. 5c  STEP 3

PROCESS AND DEVICE FOR INDICATING BRAKING POWER OR DELAY IN CARS

BACKGROUND AND SUMMARY OF THE INVENTION

This application claims the priority of German Application No. 196 24 046.8 filed in Germany on Jun. 17, 1996, the disclosure of which is expressly incorporated by reference herein.

The invention relates to a process and an arrangement for indicating the braking intensity or the deceleration of a vehicle to one following the vehicle.

For warning traffic participants who are following a leading vehicle, the application of the brakes of the leading vehicle is conventionally indicated with two or three brake lights located on the rear exterior of the vehicle. In road traffic, a driver of a vehicle following the leading vehicle is momentarily informed only that the driver of the leading vehicle is operating the brake pedal. The brake light signal provides no direct information to the following driver concerning the actual intensity of the braking or the deceleration of the leading vehicle. On the contrary, the following driver must observe and assess additional visual information to determine the deceleration of the leading vehicle, for example, by recognizing how fast the relative gap between the two vehicles is changing. Depending on how well the following driver detects and assesses this secondary visual information, the following driver must attempt to adapt the speed and the gap more or less to the vehicle driving ahead.

It is important to better inform the following driver concerning the braking operations of the leading vehicle so that the following driver can assess this situation better and faster. On the whole, this will help to reduce the number of collisions.

The human detection of the braking operation of a vehicle driving ahead is particularly difficult under conditions of poor visibility, for example, in fog, rain or at night. In such conditions, it is difficult or even impossible to distinguish the peripheral visual information. The result is a belated awareness and a longer required observation time for recognizing the situation. This often leads to a braking reaction which is not adapted to the situation, for example, to an insufficient braking deceleration, an overreaction, or a belated braking operation.

It has been discussed for some time that the one-step signalling of a braking operation (i.e., braking vs. not braking) does not contain sufficient information for the driver who is following a leading vehicle.

For example, German Patent Document DE-OS 23 61 356 discloses a switching operation for operating the brake lights of a vehicle. It is then described that, particularly under conditions of poor visibility, the secondary "hints" when a vehicle driving ahead is braked cannot be detected optimally and in time. For this purpose, indicating conditions are provided which are adapted to a respective braking condition, specifically a brief switching-on of a brake light in a first condition; a continuous operation of the brake light in a second condition; and a pulsed brief switching-off of the brake light in a third condition.

German Patent Documents DE 43 05 186 C2, DE 34 31 898 A1, DE 37 02 718 A1 as well as DE 38 11 339 A1 and DE 40 20 464 A1 also relate to blinker signals.

German Patent Documents DE 43 05 186 C2 and DE 40 03 313 A1 also provide additional information concerning the braking intensity by means of an enlargement of the lighted surface of the respective brake light.

Finally, in German Patent Document DE 31 19 386 A1, variables are determined of which at least one depends on the operation of the brake pedal. On the basis of the variable which corresponds to the deceleration of the vehicle driving ahead, the light intensity of the brake lights is determined.

In the case of all above-mentioned processes or arrangements it is a disadvantage that the visual information, particularly the flashing information, assigned to a certain braking action must usually first be learned in order to be able to assign it to the corresponding braking action. The information learned by such a learning operation must, at least in an initial phase, be called up by way of a conscious mental step during a later application. Such a consciously made mental step more or less requires time for the recognition of the meaning of the perceived visual signals. Particularly in critical situations, this time is extremely scarce so that it should be kept as brief as possible.

It is an object of the present invention to further develop a process and an arrangement of the initially mentioned type so that detailed deceleration and braking information can be detected and assigned within a very brief time period without the requirement of a learning process.

These and other objects have been achieved according to the present invention by providing a process for indicating a braking intensity of a vehicle, comprising: generating a signal which corresponds to a deceleration of the vehicle; displaying a lighted area on a display device including at least one brake light; and controlling the lighted area based upon said signal to vary at least one of a size, a position, a light intensity, and a color of said lighted area to correspond to a level of the deceleration.

These and other objects have also been achieved according to the present invention by providing an arrangement for implementing the process for indicating the braking intensity or the deceleration in the case of a vehicle, having a signal generating device which generates a signal corresponding to a deceleration, a display device which has at least two brake lights which indicate a braking information assigned to the respective signal, and a control device which controls the display device on the basis of the signal provided by the signal generating device, wherein the control device and the display device are constructed and coordinated with one another so as to control the lighted area based upon said signal to vary at least one of a size, a position, a light intensity, and a color of said lighted area to correspond to a level of the deceleration.

The essence of the present invention is therefore to take into account stimulus factors, of already known information, which occur during a deceleration operation and are essentially perceived and processed by the subconscious. When the leading vehicle which so far has moved along at the same speed as the following vehicle is braked, a number of secondary effects occur which are indirectly generated by the deceleration and are directly generated by the relative closing distance between the two vehicles.

When a braking operation of the leading vehicle is initiated and the relative distance between two vehicles is therefore reduced, the driver of the following vehicle perceives a change of the light intensity of the brake lights. Furthermore, in the case of an approach between two vehicles, because of the change of the visual observation angle, the following driver will perceive a size change of the luminous surfaces of the brake lights as well as of a position change of the luminous surfaces.

In the case of a more intensive braking of a vehicle driving ahead, there will also be a "braking dive" which results in a lifting of the brake lights. From experience, a vehicle operator will also be familiar with this information. He does not have to learn the interpretation of all above-mentioned visual stimuli and information. Such visual stimuli and information is exercised and absorbed such that, without any learning process, it can be translated directly and essentially from the subconscious. By means of the above-mentioned measures, so-called stimulus factors which are represented as visual information by means of the brake lights are optimally taken into account. The normally occurring secondary effects during a braking operation are used in a targeted manner for coding the braking intensity.

In one preferred embodiment, the main illumination points of the lighted surface assigned to one brake light respectively experience a position change corresponding to the intensity of the deceleration. The main illumination point is that point of a luminous surface which is surrounded by the lighted surface in the same manner, thus with respect to the point of concentration.

Such a position change results from the fact that the main illumination points of the lighted surfaces of two brake lights of a vehicle arranged side-by-side appear to move toward the outside relative to one another as one is approaching the vehicle. Therefore, this embodiment utilizes the effect which is generated by the approaching vehicle in the case of which the brake lights seem to move apart because of a change of the observation angle.

According to another preferred embodiment, the main illumination points of the brake lights are moved upward with an increased deceleration, which utilizes the effect of the braking dive of a vehicle. Depending on the intensity of the deceleration, the vehicle operator who is following therefore receives an intensified information with respect to the intensity with which the vehicle driving ahead is decelerated.

According to another preferred embodiment, the illuminated surfaces of the brake lights are enlarged to intensify the following driver's perception of approaching the leading vehicle, possibly in combination with one of the previously mentioned processes.

The increase of the brightness of the lighted surface of a brake light has a similar effect. A brighter light can naturally be perceived to be the result of a more intensive braking, without the requirement of learning this relationship previously.

According to another preferred embodiment, at least one additional brake light is arranged which will light up only starting at a specific deceleration intensity.

The attention of vehicle operators who are following will increasingly be drawn if the change of the indication, such as the position change, the intensity change or the size change of the lighting-up surface, takes place in discrete steps. A "jump" of the lighting-up surface will increasingly signal that the deceleration is now in another, possibly more dangerous range. A two-step or three-step indication is preferably used in this case.

In order to be able to better assign the indication, according to another advantageous embodiment, when the braking is carried out at a certain deceleration value, before the visual braking information is indicated which corresponds to this deceleration value, there will be a successive passing through all braking indication steps which are connected in front and correspond to a lower deceleration. As the result of the successive passing through of the preceding braking indication information, the operator of a vehicle which is following can better estimate the deceleration because he or she knows that the indication must not be assigned to a braking in a lower range but to a range which is above it in steps. This eliminates a confusion of the individual indication steps.

According to further advantageous embodiments, for generating the signal corresponding to the deceleration, the brake pedal operation (for example, the brake pedal force or the speed of the pedal operation) and/or the braking pressure in a brake circuit and/or the operation of an antilock system and/or the coefficient of friction between the road and the wheels and/or the operation of the gas pedal will be analyzed. Naturally, it is also possible to analyze additional information which provides information on an acceleration or deceleration of the vehicle.

Other objects, advantages and novel features of the present invention will become apparent from the following detailed description of preferred embodiments of the invention when considered in conjunction with the accompanying drawings.

BRIEF DESCRIPTION OF THE DRAWINGS

FIGS. 1a to 1c are views of rear brake lights of a vehicle with a size of the lighting surface being successively enlarged corresponding to an increasing braking intensity, configured according to preferred embodiments of the invention;

FIGS. 2a to 2c are views of rear brake lights of a vehicle with a position of the lighted surface successively moving toward the outside corresponding to an increasing braking intensity, configured according to preferred embodiments of the invention;

FIGS. 3a to 3c are views of rear brake lights of a vehicle with a position of the lighted surface successively moving upward corresponding to an increasing braking intensity, configured according to preferred embodiments of the invention;

FIGS. 4a to 4c are views of rear brake lights of a vehicle with the size of the lighted surface successively increasing toward the exterior top corresponding to an increasing braking intensity, configured according to preferred embodiments of the invention;

FIGS. 5a to 5c are views of rear brake lights of a vehicle with the size of the lighted surface successively increasing toward the exterior top corresponding to an increasing braking intensity, in which, in addition, one elevated central braking light respectively is arranged, configured according to preferred embodiments of the invention;

DETAILED DESCRIPTION OF THE DRAWINGS

Figure 9:
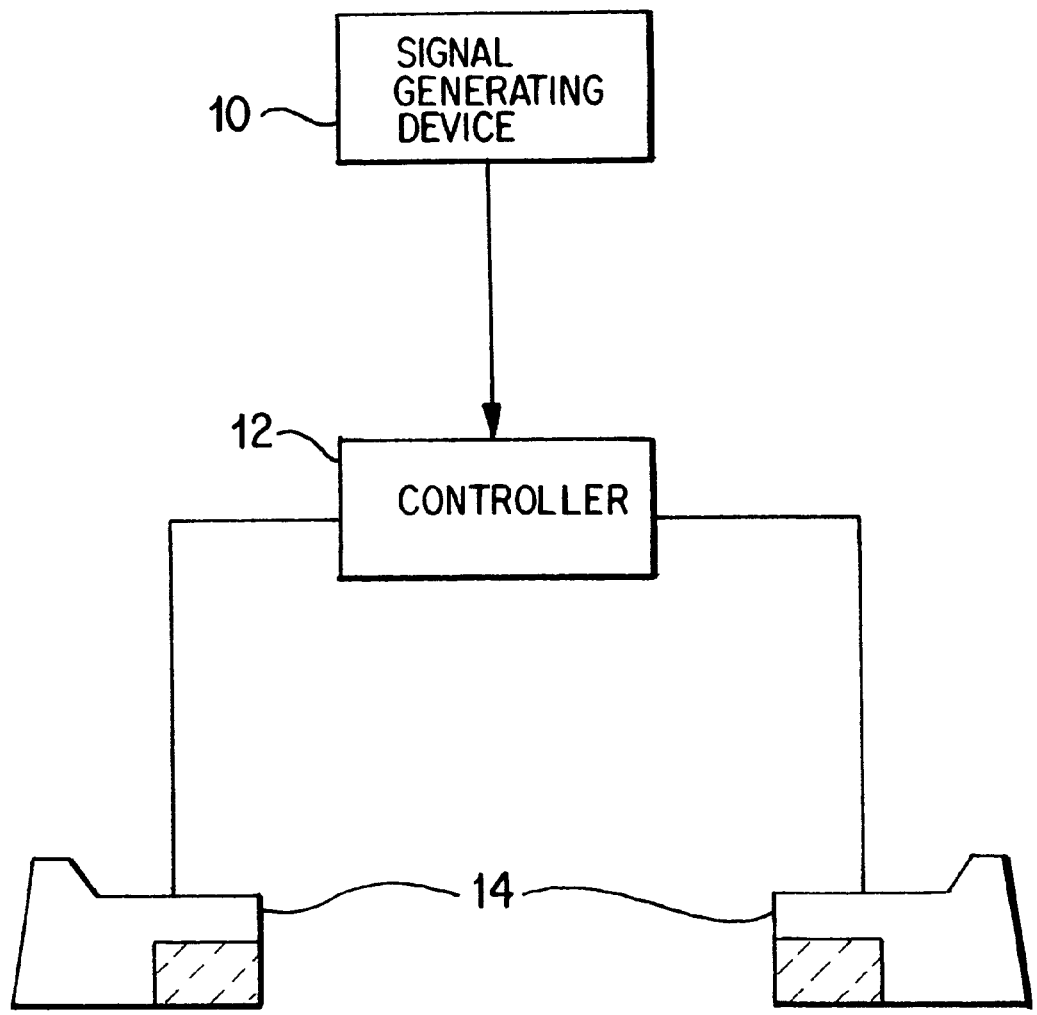
FIG. 9 shows a schematic view of a deceleration sensor and a controller which controls the rear brake lights of a vehicle, in accordance with preferred embodiments of the present invention.

Referring to FIG. 9, a signal generating device 10 is known which generates a signal corresponding to a deceleration of a vehicle. For this purpose, a sensor is required, for example, for sensing the brake pedal operation, the braking pressure or another indicator which indicates at what intensity the vehicle is braked. The use of an acceleration or deceleration sensor is also contemplated. A controller 12 receives the signal generated by the signal generating device and causes an indicating device 14 to light up in a predetermined manner corresponding to the deceleration. If certain comparative values are required by the control device, these can be filed in a memory. The indicating device normally consists of two or three brake lights which are arranged on the rear of a vehicle.

In the following, only the lighted surfaces on these indicating devices are explained which have a certain stimulating effect on a driver of a vehicle which is following a leading vehicle having these indicating devices.

FIGS. 1 through 7 each schematically illustrate two brake lights which are arranged on the rear of a vehicle. Depending on the level of braking intensity, a block surface appears within the brake light boundary which represents the lighted surface of the brake light during a braking operation.

FIGS. 1a to 1c illustrate a change of the size of this surface without any preferred direction. Depending on the deceleration intensity, when the deceleration is low, a smaller surface will first light up (step 1 in FIG. 1a); in the case of a medium deceleration, a larger surface (step 2 in FIG. 1b) will light up; and in the case of a high deceleration, the braking surface will be fully illuminated over a large surface (step 3 in FIG. 1c).

This approach utilizes the effect that an approaching vehicle becomes larger and the rear lights will also increasingly appear larger. During the transition from one step to the next, this effect is utilized and intensified so that the operator of a vehicle which is following will immediately notice a more intensive braking of a vehicle driving ahead and can also assess the deceleration intensity.

It is very important in this case that based on the experience of a vehicle operator, this effect does not have to be learned. It is already part of the driver's knowledge; specifically, it is part of his subconscious developed through normal driving operation and experience. For this reason, when perceiving a signal emitted by a brake light, which provides the braking information in greater detail, the driver does not have to carry out an active thinking process which may cost valuable time. The latter explanations also apply to all embodiments of processes according to FIGS. 2 through 7 which follow.

It was found to be advantageous to not let the individual steps change discretely into one another because it is possible that the driver will not be able to perceive such changes as rapidly. In the present embodiments of FIGS. 1 through 7, the brake lights are operated in three discrete steps. As an alternative, two or more than three steps may also be selected. The smallest step is assigned to a deceleration range with a low deceleration. The medium step is assigned to a medium deceleration range; and the third step is assigned to a high deceleration range. In this case, additional information, such as the coefficient of friction between the road and the vehicle tire as well as, for example, the operation of an antilock system may have an effect when such deceleration ranges are divided. Thus, it is known that a certain deceleration on ice may already be the maximal deceleration, thus, an emergency braking, whereas the same deceleration value on a dry road is in the range of a medium deceleration.

When the brake lights are operated in discrete steps, also in the case of an immediate operation of the brake pedal with a medium or higher intensity, which result in a medium or higher deceleration, there is a successive passing through the preceding steps. This, if in the embodiments of FIGS. 1 through 7, a respective deceleration is achieved which corresponds to step 3, before the indication of step 3, steps 1 and 2 are indicated in this sequence. As a result, the driver of the vehicle which is following receives information as to how large the deceleration is because he is guided from the lower to the higher value. In addition, this indicating method also has the effect that the driver receives the impression that the vehicle driving ahead of him is "jumping" toward him. This effect heightens his attention so that he can assess the braking situation correspondingly well and can optimally adapt his own braking reaction.

In the embodiment of FIGS. 2a to 2c, three steps for the operation of the brake lights are also provided, in which case, depending on the step and with an increasing deceleration, a movement takes place of the two lighting-up surfaces relative to one another toward the outside. This increases the distance of the two surfaces with respect to one another which achieves the effect of an approaching of the vehicle driving ahead.

The embodiment of FIGS. 3a to 3c also illustrates three steps corresponding to three deceleration ranges, as the deceleration increases, the lighted surface moves upwards. This utilizes the effect that, during deceleration, a vehicle dives in the front and moves upward at the rear axle so the brake lights are slightly lifted. This visual information also does not have to be learned but exists already in the knowledge of the vehicle operator based on normal driving operation and experience.

The embodiment of FIGS. 4a to 4c also illustrates three steps assigned to the corresponding deceleration ranges for the operation of the brake lights, in which case a combination of the above-mentioned embodiments is shown. With an increasing deceleration and a higher step (step 1 to 3), the lighted surfaces become larger and the main illuminating points of the lighted surfaces are displaced toward the outside and upwards.

The embodiment of FIGS. 5a to 5c includes an additional light assigned to each brake light, which additional light is operated in the event of an emergency braking, i.e., extremely high rate of deceleration. Otherwise, the embodiment of FIGS. 5a to 5c corresponds to that of FIGS. 4a to 4c.

Figure 6A:
FIGS. 6a to 6c are views of rear brake lights of a vehicle with the size of the lighted surface successively increasing toward the exterior top while the intensity of the light successively increases, corresponding to an increasing braking intensity, configured according to preferred embodiments of the invention.
Figure 6B:
Figure 6C:

FIGS. 6a to 6c illustrate an embodiment similar to that of FIGS. 4a to 4c, in which in addition to the enlargement of the lighted surfaces toward the outside and upwards, the intensity of the light increases in successive steps, as shown by crosshatching. In FIG. 6a, the intensity of the lighted surface is lowest, helping to indicate a low braking intensity. In FIG. 6b, the intensity of the lighted surface is greater, helping to indicate a higher braking intensity. In FIG. 6c, the intensity of the lighted surface is the greatest, helping to indicate a highest braking intensity. This embodiment takes into account an effect which occurs when a vehicle approaches another vehicle, specifically that the brake lights become brighter.

Figure 7A:
FIGS. 7a to 7c are views of rear brake lights of a vehicle with the size of the lighted surface successively increasing toward the exterior top while the color of the light changes, corresponding to an increasing braking intensity, configured according to preferred embodiments of the invention.
Figure 7B:
Figure 7C:
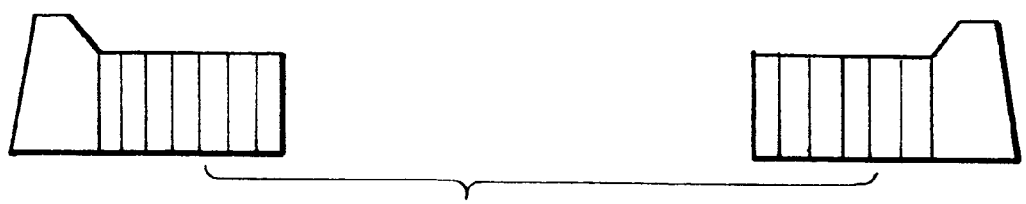

FIGS. 7a to 7c illustrate an embodiment similar to that of FIGS. 4a to 4c, in which in addition to the enlargement of the lighted surfaces toward the outside and upwards, the color of the lighted surface changes in successive steps, as shown by the color crosshatching. In FIG. 7a, the color of the lighted surface is green, helping to indicate a low braking intensity. In FIG. 7b, the color of the lighted surface is yellow, helping to indicate a higher braking intensity. In FIG. 7c, the color of the lighted surface is red, helping to indicate a highest braking intensity. This embodiment takes into account the fact that drivers subconsciously perceive and associate various colors, particularly yellow and red, with increasing levels of danger.

Naturally, continuous changes may also take place corresponding to a respective deceleration, or the number of signal steps may be changed. However, this is not always useful because, for example, in the case of an increase of the number of signal steps, this would impair the observer's ability to distinguish between the different levels of braking operation. Although the attention of a driver who is following can be additionally increased (for example, in the case of braking because of danger or in the case of stopped vehicles) by periodic, brief light pulses, the frequency coding is not suitable for displaying the braking intensity.

According to the above-mentioned preferred embodiments, the object of designing the indication of the braking operation such that the driver who is following will be provided with more information and with differentiated information concerning the deceleration of the vehicle has been achieved in a simple manner and at reasonable cost. The braking intensity can be indicated in a differentiated fashion and by the optimal taking into account of stimulus factors which are displayed as visual information by means of the brake lights. Experience is utilized in this case which is known to the respective vehicle operator so that no learning process is required and no time is lost during the braking. When stimulus factors are taken into account, the visual perceptions and observations which the driver has during the approach operation of a vehicle driving ahead are used in a targeted manner for coding the brake intensity. The present embodiments can also be connected with other possibilities for coding the indication, for example, with a form change. Thus, a triangle or an octagonal contour can light up.

By means of the differentiated indication of the braking intensity while utilizing stimulus factors, an additional safety potential can be opened up when one vehicles drives behind another by minimizing the time so that the intensity of a braking of a vehicle driving ahead is recognized correctly when its brake lights are operated. This results in a reduction of collisions which are caused by an unadapted braking behavior and leads to an improvement of the queue stability (i.e., improves the flow of traffic by reducing overbraking).

This is achieved by shortening the required processing and interpretation time of visual information, the reduction of faulty reactions by the driver, an improvement of the situation-adapted reaction in a shortest possible time as well as the improvement of the communication between the vehicle driving ahead and the vehicle which follows. In addition, the spacing behavior is improved and the deviations of speed changes of two vehicles which follow can be reduced.

The stabilizing of vehicle queues is achieved by reducing overreactions which are triggered by the incorrect assessment of the actual braking deceleration.

Figure 8:
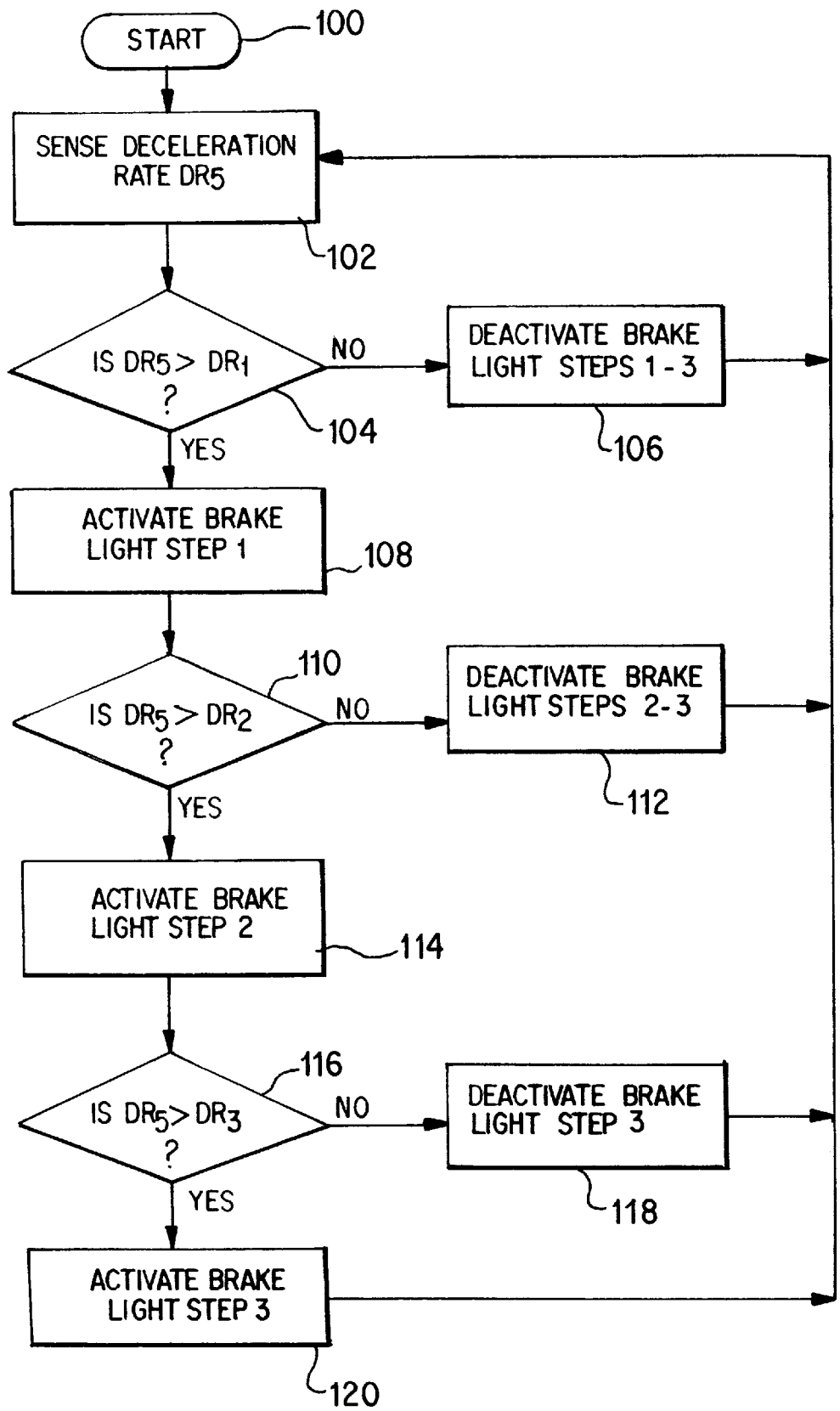
FIG. 8 shows a flow chart of steps of the process of the present invention.

FIG. 8 shows a preferred embodiment of the process of the instant invention. In step 100, the process is started. In step 102, the deceleration rate $DR_s$ is sensed. In step 104, the deceleration rate $DR_s$ is compared to a predetermined deceleration rate $DR_1$. If $DR_s > DR_1$, then brake light step 1 is activated in step 108; and if $DR_s < DR_1$, then brake light steps 1–3 are deactivated in step 106. In step 110, the deceleration rate $DR_s$ is compared to a predetermined deceleration rate $DR_2$, which is higher than predetermined deceleration rate $DR_1$. If $DR_s > DR_2$, then brake light step 2 is activated in step 114; and if $DR_s < DR_2$, then brake light steps 2–3 are deactivated in step 112. In step 116, the deceleration rate $DR_s$ is compared to a predetermined deceleration rate $DR_3$, which is higher than predetermined deceleration rate $DR_2$. If $DR_s > DR_3$, then brake light step 3 is activated in step 120; and if $DR_s < DR_3$, then brake light step 3 is deactivated in step 118.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for indicating a braking intensity of a vehicle to a driver of a following vehicle, comprising:
   generating a signal which corresponds to a level of deceleration of the vehicle,
   displaying lighted areas on at least two brake lights mounted side by side,
   controlling the lighted areas based upon said signal to vary the positions of said lighted areas to correspond to the level of deceleration, said variation of the lighted areas simulating at least one secondary visual signal directly perceived as a change in the level of deceleration by the driver of the following vehicle, said variation of the lighted areas comprising at least one of:
   (a) moving the lighted areas upward as the level of deceleration increases;
   (b) moving the lighted areas downward as the level of deceleration decreases;
   (c) moving the lighted areas apart from each other as the level of deceleration increases; and
   (d) moving the lighted areas toward each other as the level of deceleration decreases.

2. A process according to claim 1, wherein said variation of the lighted area further comprises increasing the size of said lighted areas as the level of deceleration increases, and decreasing the size of said lighted areas as the level of deceleration decreases.

3. A process according to claim 1, wherein said variation of the lighted area further comprises varying the color of the lighted area as the level of deceleration changes.

4. A process according to claim 1, wherein said variation of the lighted area further comprises increasing a light intensity of the lighted area as the level of deceleration increases, and decreasing the light intensity of the lighted area as the level of deceleration decreases.

5. A process according to claim 1, wherein said at least two brake lights will not light until a predetermined deceleration is reached.

6. A process according to claim 1, wherein the variation in the lighted areas corresponding to the deceleration is controlled to occur in discrete steps.

7. A process according to claim 1, wherein said lighted areas are controllable in a plurality of successive braking indication steps which correspond to increasing levels of said deceleration, and wherein when a signal corresponding to a given deceleration value is generated, all of said braking indication steps which correspond to a lower deceleration are successively passed through.

8. A process according to claim 1, wherein an operation of the brake pedal is analyzed to generate the signal.

9. A process according to claim 1, wherein a brake pressure in a brake circuit is analyzed to generate the signal corresponding to the deceleration.

10. A process according to claim 1, wherein an antilock braking system is analyzed to generate the signal corresponding to the deceleration.

11. A process according to claim 1, wherein a coefficient of friction between wheels of the motor vehicle and a road the vehicle is travelling on is analyzed to generate the signal corresponding to the deceleration.

12. A process according to claim 1, wherein the type of the operation of the gas pedal and/or the brake pedal is analyzed.

13. Arrangement for indicating a braking intensity of a vehicle to a driver of a following vehicle, said arrangement comprising:

a signal generating device which generates a signal corresponding to a level of deceleration of the vehicle, at least two brake lights with lighted areas mounted side by side, and a control device which controls the lighted areas based upon said signal to vary a position of said lighted areas to correspond to the level of deceleration, said variation of the lighted areas simulating at least one secondary visual signal directly perceived as a change in the level of deceleration by the driver of the following vehicle, said variation of the lighted areas comprising at least one of:

(a) moving the lighted areas upward as the level of deceleration increases;

(b) moving the lighted areas downward as the level of deceleration decreases;

(c) moving the lighted areas apart from each other as the level of deceleration increases; and (d) moving the lighted areas toward each other as the level of deceleration decreases.

14. Arrangement according to claim 13, wherein said lighted areas are controllable in a plurality of successive braking indication steps which correspond to increasing levels of said deceleration, and wherein when a signal corresponding to a given deceleration value is generated, all of said braking indication steps which correspond to a lower deceleration are successively passed through.

15. An arrangement according to claim 13, wherein said variation of the lighted areas further comprises increasing the size of said lighted area as the level of deceleration increases, and decreasing the size of said lighted areas as the level of deceleration decreases.

16. An arrangement according to claim 13, wherein said variation of the lighted area consists of moving the lighted area upward as the level of deceleration increases, and moving the lighted area downward as the level of deceleration decreases.

17. An arrangement according to claim 13, wherein said variation of the lighted area further comprises varying the color of the lighted area as the level of deceleration changes.

18. An arrangement according to claim 13, wherein said variation of the lighted area further comprises increasing a light intensity of the lighted area as the level of deceleration increases, and decreasing the light intensity of the lighted area as the level of deceleration decreases.

19. A method for visually signaling a change in a level of deceleration of a vehicle to a driver of a following vehicle via at least two brake lights mounted side by side and having lighted areas which are variable in size and position, said method comprising the act of:

varying at least the position of said lighted areas to correspond to the level of deceleration, said variation of the lighted areas comprising at least one of:

(a) moving the lighted areas upward as the level of deceleration increases;

(b) moving the lighted areas downward as the level of deceleration decreases;

(c) moving the lighted areas apart from each other as the level of deceleration increases; and (d) moving the lighted areas toward each other as the level of deceleration decreases.

20. A method according to claim 19, wherein said variation of the lighted areas includes increasing the size of said lighted areas as the level of deceleration increases, and decreasing the size of said lighted areas as the level of deceleration decreases.

21. A method according to claim 19, wherein said variation of the lighted area consists of moving the lighted area upward as the level of deceleration increases, and moving the lighted area downward as the level of deceleration decreases.

22. An arrangement for visually signaling a change in a level of deceleration of a vehicle to a driver of a following vehicle, said arrangement comprising:

at least two brake lights mounted side by side and having lighted areas which are variable in size and position; and a control device controllingly coupled to said at least two brake lights to vary at least one of the size and the position of said lighted areas to correspond to the level of deceleration, said variation of the lighted areas comprising at least one of:

(a) moving the lighted areas upward as the level of deceleration increases;

(b) moving the lighted areas downward as the level of deceleration decreases;

(c) moving the lighted areas apart from each other as the level of deceleration increases; and (d) moving the lighted areas toward each other as the level of deceleration decreases.

23. An arrangement according to claim 22, wherein said variation of the lighted areas includes increasing the size of said lighted areas as the level of deceleration increases.

24. An arrangement according to claim 22, wherein said variation of the lighted area consists of moving the lighted area upward as the level of deceleration increases, and moving the lighted area downward as the level of deceleration decreases.

* * * * *